(12) United States Patent
Han et al.

(10) Patent No.: US 12,179,885 B2
(45) Date of Patent: Dec. 31, 2024

(54) METHOD AND DEVICE FOR REDUCING WAVE-MAKING RESISTANCE AND FRICTION FORCE DURING SHIP NAVIGATION

(71) Applicants: TIANJIN HUANUO COMMUNICATION ENGINEERING CO., LTD., Tianjin (CN); Dejiao Xu, Beijing (CN); Guangshu Liu, Tianjin (CN); Jiliang Han, Tianjin (CN)

(72) Inventors: Jiliang Han, Tianjin (CN); Zhanpeng Xu, Liaoning (CN); Guangshu Liu, Tianjin (CN); Xueni Jia, Shaanxi (CN)

(73) Assignees: TIANJIN HUANUO COMMUNICATION ENGINEERING CO., LTD., Tianjin (CN); Dejiao Xu, Beijing (CN); Guangshu Liu, Tianjin (CN); Jiliang Han, Tianjin (CN)

( * ) Notice: Subject to any disclaimer, the term of this patent is extended or adjusted under 35 U.S.C. 154(b) by 434 days.

(21) Appl. No.: 17/640,351

(22) PCT Filed: Dec. 15, 2020

(86) PCT No.: PCT/CN2020/136459
§ 371 (c)(1),
(2) Date: Mar. 4, 2022

(87) PCT Pub. No.: WO2021/129460
PCT Pub. Date: Jul. 1, 2021

(65) Prior Publication Data
US 2022/0340235 A1    Oct. 27, 2022

(30) Foreign Application Priority Data
Dec. 28, 2019  (CN) .......................... 201911384539.0

(51) Int. Cl.
*B63B 1/38* (2006.01)
(52) U.S. Cl.
CPC .......... *B63B 1/38* (2013.01); *B63B 2001/385* (2013.01)
(58) Field of Classification Search
CPC ........................... B63B 1/38; B63B 2001/385
See application file for complete search history.

(56) References Cited

U.S. PATENT DOCUMENTS

| 2,401,583 A | * | 6/1946 | Redfield | ................ B63G 13/02 114/15 |
| 2,954,750 A | | 10/1960 | Crump et al. | |

(Continued)

FOREIGN PATENT DOCUMENTS

| CN | 1109681 | 10/1995 |
| CN | 2541642 | 3/2003 |

(Continued)

OTHER PUBLICATIONS

"Search Report of Europe Counterpart Application", issued on Oct. 17, 2022, p. 1-p. 12.

(Continued)

*Primary Examiner* — Stephen P Avila
(74) *Attorney, Agent, or Firm* — JCIPRNET

(57) ABSTRACT

Disclosed are a method and a device for reducing the wave-making resistance and friction force during ship navigation. The device includes a gas-liquid mixing device and a control device that are connected. The gas-liquid mixing device is provided with a water inlet, a gas inlet, a water outlet, and a gas-liquid mixing cavity arranged between the water inlet and the water outlet. Water and gas enter the gas-liquid mixing cavity via the water inlet and the gas inlet respectively, the control device controls gas intake at the gas inlet, and in this process, the water inlet is controlled to (Continued)

intermittently suspend water intake or intermittently implement low-speed water intake or implement continuous low-speed water intake, so that more gas enters the gas-liquid mixing cavity.

19 Claims, 6 Drawing Sheets

(56) References Cited

U.S. PATENT DOCUMENTS

| | | | |
|---|---|---|---|
| 3,580,204 | A | 5/1971 | Burmeister et al. |
| 2017/0029073 | A1 | 2/2017 | Costas et al. |

FOREIGN PATENT DOCUMENTS

| | | |
|---|---|---|
| CN | 104265697 | 1/2015 |
| CN | 105189278 | 12/2015 |
| CN | 105438398 | 3/2016 |
| CN | 105857511 | 8/2016 |
| CN | 106564562 | 4/2017 |
| CN | 209020581 | 6/2019 |
| CN | 110962991 | 4/2020 |
| DE | 2521418 | 11/1976 |
| JP | S60139586 | 7/1985 |
| JP | H0657793 | 8/1994 |
| JP | H09151913 | 6/1997 |
| JP | 2001233292 | 8/2001 |
| JP | 2009248611 | 10/2009 |
| JP | 2012106542 | 6/2012 |
| JP | 2018513018 | 5/2018 |
| WO | 2009139132 | 11/2009 |

OTHER PUBLICATIONS

"Office Action of Japan Counterpart Application", issued on Mar. 22, 2023, p. 1-p. 9.

"International Search Report (Form PCT/ISA/210) of PCT/CN2020/136459," mailed on Mar. 12, 2021, with English translation thereof, pp. 1-6.

* cited by examiner

METHOD AND DEVICE FOR REDUCING WAVE-MAKING RESISTANCE AND FRICTION FORCE DURING SHIP NAVIGATION

CROSS-REFERENCE TO RELATED APPLICATION

This application is a 371 of international application of PCT application serial no. PCT/CN2020/136459, filed on Dec. 15, 2020 which claims the priority benefit of China application no. 201911384539.0, filed on Dec. 28, 2019. The entirety of each of the above mentioned patent applications is hereby incorporated by reference herein and made a part of this specification.

TECHNICAL FIELD

The present invention relates to the technical field of water navigation of vessels, ships, etc., in particular to a method and device for reducing the wave-making resistance and friction force during ship navigation.

DESCRIPTION OF RELATED ART

Ocean transportation has always been an important mode of international trade transportation, with a share of more than 70%. China is also the country with the largest demand for international transportation, and a large number of ships sail on the seas and rivers. When ships sail, due to the large water resistance, the energy consumption is huge in order to achieve a certain navigation speed.

Naval ships are important equipment for a country to move towards deep blue, and shoulder the dignity of the country and the nation. High maneuverability, fast speed and low fuel consumption are the symbols of naval modernization. In order to achieve these properties, most of the traditional research directions are to improve the performance of steel, reduce the overall weight of a ship, increase the power of a gas turbine or an engine, design the shape of a ship itself, etc., which require a lot of manpower, material resources and time costs.

Supercavitation technology, which has attracted much attention in recent years, refers to the phenomenon in which the water on the surface of a navigation body is vaporized due to the reduction of pressure when the navigation body and the water move relative to each other at a high speed. Supercavities can be generated when the navigation speed reaches 185 km/h. After the water is vaporized, bubbles are formed in the water, and the navigation body travels in the bubbles, that is, the navigation body is in contact with air instead of water. The density of air is $\frac{1}{800}$ of that of water. The resistance generated by different densities of media is different. The resistance generated by the medium with low density is lower than that generated by the medium with high density, so the resistance of air is only $\frac{1}{800}$ of that of water. Thus, the resistance of the navigation body decreases, and the speed can be greatly improved under the same fuel consumption.

According to the principle of supercavitation, there are three methods to generate supercavities: 1, increase the navigation speed; 2, reduce the pressure; and 3, increase the cavitation capacity by artificial ventilation at a low speed. The first two methods form natural supercavities, and the last method forms so-called ventilated supercavities.

The supercavitating torpedo developed by the Soviet Union is several times faster than ordinary torpedoes, and also provides vessels and ships with technologies for reference. The United States Navy used the supercavitation technology for the first time to develop a small high-speed test ship, which is also a ship designed by means of the principle of supercavitation, namely the "Ghost" ship, with a speed of more than 100 km/h. The method this ship uses is increasing the navigation speed. The engines of the "Ghost" supercavitating stealth speedboat are mainly two T53-L-703 turboshaft engines installed in pontoons, which drive rotating propellers located in pods at the front part of the hull, so that the propellers rotate to generate a "supercavitation" effect. An air cavity is formed between the surface of the hull and water, so that the frictional resistance generated by the boat during navigation is 900 times less than that in water. The "Ghost" supercavitating stealth speedboat is also equipped with a novel jet type cavity generator, which is driven by the power of an on-board battery pack. When navigation, the cavity generator installed in the front of the torpedo-shaped lower body first generates local cavities, and then the local cavities are injected with air by breather pipes installed in the middle and rear parts of the torpedo-shaped lower body, and expand into supercavities. With the cavity generator, after stable supercavities are formed on the surface of a pair of torpedo-shaped lower bodies of the "Ghost" supercavitating stealth speedboat, the boat will gradually accelerate to a speed of nearly 200 km/h. In the state of high-speed navigation, the boat can still pass through 3-meter-high waves, and can maintain stable navigation for a long time.

However, large ships and vessels do not have such high speed requirements, because it is not particularly necessary, the cost is too high, and it is difficult to achieve. Therefore, it is a realistic pursuit to appropriately increase the speed of ships, reduce fuel consumption, and improve the maneuverability of ships.

The improvement on the performance of vessels and ships has become an important branch of shipbuilding industry research in various countries of the world. After years of research and exploration, scientific research institutes in Russia, Japan, the United States, Europe, and China have substantially unified the direction of research and development, and research devices to reduce ship resistance generally by injecting air into the bottom of the ship, that is, to increase the cavity capacity by artificial ventilation. In view of the tests done by the research institute of China State Shipbuilding Corporation Limited and the application documents published by patents and papers, the main direction thereof is also the same. The basic principle is to form an air layer at the bottom of the ship by injecting air to isolate the bottom of the ship from seawater (river water), thereby reducing the frictional resistance between the bottom of the navigation body and the seawater. Since the frictional resistance is the main resistance to low-speed navigation, the speed can be increased by more than 7% under the same fuel consumption.

However, the dimensions of a supercavity, such as the diameter Dc of the maximum section in the center of the supercavity, and the total length Lc of the supercavity, are related to the cavitation number a, the diameter Dn of a cavitator, and the resistance coefficient Cx of the cavitator. The dimensions of the supercavity can be controlled by changing σ and Cx. By supplying air to the supercavity, the ventilation pressure Pc in the supercavity is increased, so that the cavitation number σ is reduced. There is a certain relationship between the cavitation number σ and the ventilation flow. There is a limit to reducing the σ value by artificial ventilation, which is the minimum cavitation number σ min that can be achieved. The σ in the ventilated supercavity changes within a certain range. When the speed of an object is relatively low (10 m/s to 100 m/s), it is effective to control the dimensions of the supercavity by the artificial ventilation, while when the speed U is much greater than 100 m/s, the artificial ventilation is meaningless. Therefore, the artificial ventilation increasing cavity capacity is only suitable for low-speed ships, not for medium-speed and high-speed ships. Moreover, as the speed of the ship increases, the frictional resistance gradually decreases, and the wave-making resistance gradually increases. The injection of bubbles to the bottom of the ship basically has little effect on the wave-making resistance.

The bulbous bow is mainly to reduce the wave-making resistance, and has been widely used in large ships, but the performance that the bulbous bow can improve is limited.

SUMMARY

The objective of the present invention is to provide a method and device for reducing the wave-making resistance and friction force during ship navigation, which can be used for medium-speed and high-speed ships, especially medium and large ships with a speed of more than 20-45 knots.

To achieve the above objective, the technical solution adopted in the present invention is as follows.

A method for reducing the wave-making resistance and friction force during ship navigation includes injecting an air-water mixture containing bubbles into water areas in front of the bottom of a ship or/and in front of the bow or/and on both sides of the ship.

In the air-water mixture, the volume of air accounts for 10% to 60%.

The air-water mixture containing bubbles is injected into the water areas in front of one side of the ship or/and in back of the other side of the ship, to assist the ship in turning or turning around. Or, the air-water mixture containing bubbles is injected into the water area on one side of the ship, to assist the ship in translating to the side.

A device for generating an air-water mixture containing bubbles includes:

a gas-liquid mixing device provided with a water inlet, a gas inlet and a water outlet, wherein the gas-liquid mixing device is provided with a gas-liquid mixing cavity between the water inlet and the water outlet, water enters the gas-liquid mixing cavity via the water inlet, and gas enters the gas-liquid mixing cavity via the gas inlet; and a control device, which is connected to the gas-liquid mixing device, and controls continuous low-speed water intake, or intermittent suspension of water intake, or cyclic switching between high-speed water intake and low-speed water intake at the water inlet during the gas intake at the gas inlet.

The water entering the gas-liquid mixing cavity is mixed with air to form the air-water mixture containing bubbles, and the air-water mixture is discharged via the water outlet.

The water intake is suspended at the water inlet each time for 1 second to 9 seconds. Or, when the low-speed water intake is intermittent at the water inlet, the time for the low-speed water intake each time is 1 second to 9 seconds.

The water inlet, the gas inlet and the water outlet of the gas-liquid mixing device are respectively connected with a water inlet pipe, a gas inlet pipe and a water outlet pipe.

The gas-liquid mixing device at least includes a variable frequency water pump, a water inlet of the variable frequency water pump is connected to the water inlet pipe or simultaneously connected to the water inlet pipe and the gas inlet pipe, and the control device controls an impeller of the variable frequency water pump to continuously rotate at a low speed, so that the low-speed water intake is continuous at the water inlet. Or, the control device controls the impeller of the variable frequency water pump to cyclically switch between high-speed rotation and low-speed rotation, so that the low-speed water intake is intermittent at the water inlet. Or, the control device controls the impeller of the variable frequency water pump to intermittently suspend rotating, so that the water intake is intermittently suspended at the water inlet.

The variable frequency water pump is set as the gas-liquid mixing device, the water inlet of the variable frequency water pump is connected to the water inlet pipe and the gas inlet pipe by a three-way device, the water outlet is connected to the water outlet pipe, and a pump body cavity of the variable frequency water pump is formed as the gas-liquid mixing cavity.

The gas-liquid mixing device includes the variable frequency water pump and a gas-liquid mixing pump, the water inlet of the variable frequency water pump is communicated with the water inlet pipe, the gas-liquid mixing pump includes a pump body, the pump body is provided with a water inlet, a gas inlet and a water outlet, the water outlet of the variable frequency water pump is communicated with the water inlet of the gas-liquid mixing pump, the gas inlet of the gas-liquid mixing pump is connected to the gas inlet pipe, the water outlet of the gas-liquid mixing pump is connected to the water outlet pipe, and a pump body cavity of the gas-liquid mixing pump is the gas-liquid mixing cavity. During the operation of the gas-liquid mixing pump, the control device controls continuous low-speed water intake or intermittent suspension of water intake or cyclic switching between high-speed water intake and low-speed water intake at the water inlet of the variable frequency water pump.

The gas-liquid mixing device includes the variable frequency water pump and a Venturi jet device. A Venturi tube, a suction chamber, a mixing chamber, and a diffusion chamber that are communicated are arranged in the Venturi jet device. The suction chamber is provided with a water inlet and a gas inlet, the water inlet of the variable frequency water pump is connected to the water inlet pipe, the water outlet of the variable frequency water pump is communicated with the water inlet of the suction chamber, the gas inlet of the suction chamber is connected to the gas inlet pipe, the outlet of the diffusion chamber is connected to the water outlet pipe, and the mixing chamber is set as the gas-liquid mixing cavity.

The gas-liquid mixing device includes the variable frequency water pump and a Venturi tube type jet device. The Venturi tube type jet device includes a suction chamber, a liquid inlet pipe, a throat pipe, a diffusion pipe, and a tail pipe that are communicated. The suction chamber is provided with a gas inlet, the water outlet of the variable frequency water pump is connected to a liquid inlet of the liquid inlet pipe, the gas inlet of the suction chamber is connected to the gas inlet pipe, an outlet of the tail pipe is connected to the water outlet pipe, and the throat pipe is set as the gas-liquid mixing cavity.

The water inlet pipe, the gas inlet pipe and the water outlet pipe are all provided with electric valves thereon, the electric valves are connected with the control device, and the control device controls the flow and switching of the water inlet pipe, the gas inlet pipe and the water outlet pipe by controlling the electric valves.

A device for reducing the wave-making resistance and friction force during ship navigation, including the above-mentioned device for generating an air-water mixture containing bubbles, and an upper computer. The upper computer is connected to the control device and sends instructions to the control device, and the control device controls, according to the instructions, the water intake at the water inlet and the gas intake at the gas inlet of the device for generating the air-water mixture containing bubbles.

The device for reducing the wave-making resistance and friction force during ship navigation further includes arc-shaped baffles open to the rear, the baffles are connected to the front side of the bow at intervals and located below a waterline. When the injected air-water mixture containing bubbles hits the baffles forward, it will be blocked by the baffles and flow backward. Preferably, a polytetrafluoroethylene layer is arranged on surfaces of the arc-shaped baffles.

The water outlet pipe is laid on the outside of the hull and fixed relative to the hull, the air-water mixture containing bubbles is directly injected into the water area from the water outlet of the water outlet pipe, and the water outlet of the water outlet pipe is formed as an injection port of the device for reducing the wave-making resistance and friction force during ship navigation. Or, the hull is provided with a water outlet hole, the water outlet of the water outlet pipe is communicated with the water outlet hole by a flange or the like, and the water outlet hole on the hull is an injection port of the device for reducing the wave-making resistance and friction force during ship navigation. A plurality of the injection ports are formed at the front end of the ship or/and on both sides of the ship, and the injection ports are arranged below the waterline.

The injection ports at the front end of the ship are arranged forward, and the injection ports on both sides are arranged obliquely backward.

The injection ports on both sides of the ship are arranged at the middle and front parts of the hull.

The gas inlet pipe is laid on the ship and fixed relative to the hull, and air directly enters the gas-liquid mixing cavity through the gas inlet pipe, so that the gas inlet of the gas inlet pipe is formed as a gas entry port. Or, a gas inlet is arranged at the part of the hull above the waterline, the gas inlet pipe is communicated with the gas inlet, and the gas inlet on the hull is a gas entry port. The gas entry port is arranged above the waterline.

The water inlet pipe is laid on the outside of the hull and fixed relative to the hull, and water enters directly from the water inlet of the gas inlet pipe, so that the water inlet of the water inlet pipe is formed as a liquid entry port. Or, the hull is provided with a water inlet hole, the water inlet of the water inlet pipe is communicated with the water inlet hole by a flange or the like, and the water inlet hole on the hull is a liquid entry port.

The liquid entry port is arranged below the injection port.

The liquid entry port is arranged at the front part of the ship.

The present invention has the following advantages.

The present invention uses another technical evolution route different from the above technical solutions, and is mainly aimed at improving the performance of medium-speed and high-speed vessels and ships and reducing the wave-making resistance of such vessels and ships.

The beneficial technical effects of the present invention are as follows.

1. The air-water mixture containing bubbles is injected into water areas in front of and on both sides of a ship, thereby reducing the density of seawater (river water) in the relevant water areas, and further reducing the wave-making resistance, partial frictional resistance and eddy resistance encountered by the relevant parts of the ship. The injection of the air-water mixture into the water areas in front of the ship can reduce the resistance of the water areas in front of the ship to the advance of the ship, which can increase the speed of the ship under the same fuel consumption, or reduce the fuel consumption at the same speed.

2. The air-water mixture containing bubbles is injected into the water areas in front of one side of the ship or/and in back of the other side of the ship, to assist the ship in turning or turning around. Or, the air-water mixture containing bubbles is injected into the water area on one side of the ship, to assist the ship in translating to the side, thereby improving the maneuverability of the ship.

3. With the device for generating an air-water mixture containing bubbles in the present invention, air and water are mixed in the gas-liquid mixing cavity into an air-water mixture, and continuous low-speed water intake or intermittent low-speed water intake or intermittent suspension of water intake at the water inlet is controlled, so that the air content in the gas-liquid mixing cavity is greatly increased, and the air-water mixture generated by the device for generating an air-water mixture containing bubbles in the present invention contains a large number of bubbles, with high air content. After the air-water mixture generated by the device for generating an air-water mixture containing bubbles in the present invention is injected into water areas, the water density of the water areas can be greatly reduced, thereby greatly increasing the speed of the ship, greatly reducing the fuel consumption, and greatly improving the maneuverability of the ship.

4. The upper computer on the ship can issue instructions to the control device according to the actual requirements of the ship, and the control device controls, according to these instructions, the electric valves of the water inlet pipe, the gas inlet pipe and the water outlet pipe or/and the speed of the impeller of the variable frequency water pump, to control the flow of water intake, gas intake and water discharge and the water discharge position, so as to adjust the injection quantity, injection speed and injection position of the air-water mixture containing bubbles, and realize the operations of rapid speed adjustment, turning around or translation of the ship, which greatly improves the performance of the ship.

In summary, the present invention is suitable for medium and large ships with a speed of more than 20 to 45 knots, and can greatly increase the navigation speed of such large ships, greatly reduce fuel consumption, and greatly improve the maneuverability of ships, thereby greatly improving the performance of ships, reducing transportation and time costs, and achieving energy conservation and environmental protection, which can promote the development of China's naval modernization of national defense and meet national development needs.

DESCRIPTION OF THE EMBODIMENTS

Figure 1:
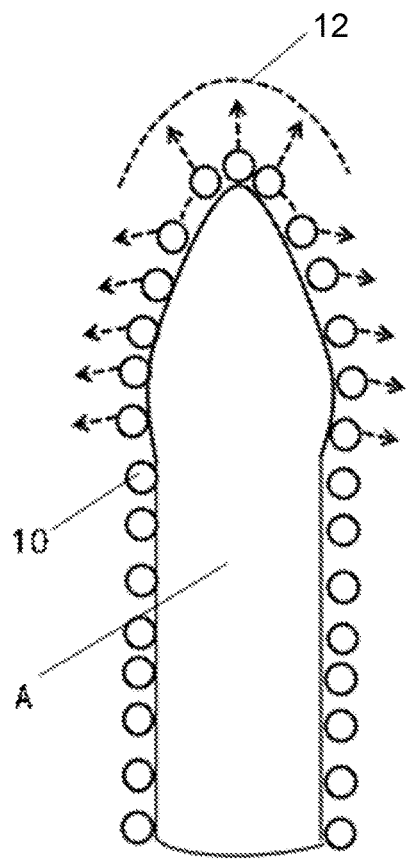
FIG. 1 to FIG. 3 are schematic illustrations of injection of an air-water mixture into water areas at different positions in the present invention (only the front half part of a ship with injection ports is shown in the figure)
Figure 2:
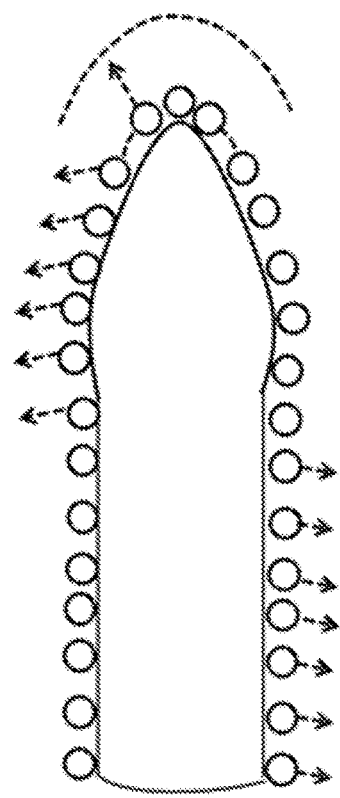
Figure 3:
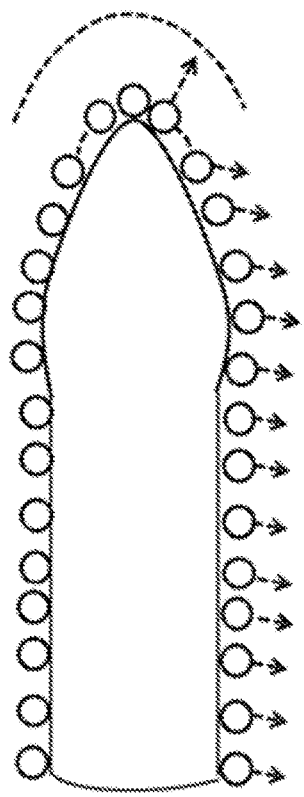

As shown in FIGS. 1, 2 and 3, a method for reducing the wave-making resistance and friction force during ship navigation is to inject an air-water mixture containing bubbles into water areas in front of a ship A or/and on both sides of the ship (the arrows in the figures indicate injection directions).

In the air-water mixture, the volume ratio of air is 10% to 60%, and preferably, the volume ratio is 40%.

Preferably, when the air-water mixture containing bubbles is injected into the water areas on both sides of the ship, the air-water mixture containing bubbles is injected only into the water areas at the middle and front parts of the hull as far as possible, that is, the injection position does not exceed the middle part of the hull, which avoids the damage of devices such as propellers at the stern of the ship due to the burst of bubbles. The air-water mixture may also be injected into the water areas at the middle and rear parts of hulls of special ships, such as tugboats.

Ship type, ship length, navigation speed, etc. are important factors affecting the wave-making resistance. For a given ship type, its wave-making resistance is proportional to the sixth power of the speed and proportional to the fluid density. The formula for calculating the resistance in fluid mechanics is:

$$X = C_x q S$$

In the formula, X is resistance (the resistance is in the same direction as the inflow speed, and is positive backward), $C_x$ is a resistance coefficient, q is dynamic pressure, $q = \rho v^* v/2$ ($\rho$ is air density, v is a flow rate of airflow relative to an object), and S is a reference area.

The ship is subjected to frictional resistance, wave-making resistance, eddy resistance, etc. during navigation. The ship is mainly subjected to frictional resistance at a low speed, and the wave-making resistance exceeds 50% at a high speed. The wave-making resistance is proportional to the sixth power of the speed and proportional to the density of water. Under the same condition, the navigation speed of the ship can be greatly increased by reducing the density of water, or the fuel consumption can be reduced by inversely reducing the kinetic energy cancelled by the wave-making resistance at the same speed.

When the ship sails straight forward, the air-water mixture containing bubbles is injected into the water areas in front of the ship and on both sides of the ship (as shown in FIG. 1). The air-water mixture injected into the water areas in front of the ship not only disrupts the water areas in the forward direction of the ship, but also can reduce the water density of the water areas in the forward direction of the ship, thereby reducing the resistance in the forward direction of the ship. In addition, when the ship sails forward, the bubbles in the air-water mixture injected into the water areas on both sides of the ship will burst and escape from both sides of the ship. Since the density of the air-water mixture and the density of the bubbles are lower than that of water, low-density water spaces with a density much lower than that of seawater (river water) are formed in front of and on both sides of the ship. Thus, the wave-making resistance, partial frictional resistance and eddy resistance of the ship are greatly reduced, so that the speed of the ship is greatly increased on the basis of the same fuel consumption, and if the same speed is maintained, the fuel consumption is greatly reduced.

When the ship is about to turn around, the air-water mixture containing bubbles can be injected into the water areas in front of one side of the ship and in back of the other side of the ship. Taking a left turn of the ship as an example, as shown in FIG. 2, the air-water mixture containing bubbles is injected into the water area in front of the left side of the ship and the water area in back of the right side, then the water density of the water area in front of the left side of the ship is lower than that of the water area in front of the right side, the water density of the water area in back of the right side of the ship is lower than that of the water area in back of the left side, and thus the wave-making resistance, partial friction resistance and eddy resistance in front of the left side of the ship are lower than those in front of the right side of the ship, and the wave-making resistance, partial friction resistance and eddy resistance in back of the right side of the ship are lower than those in back of the left side of the ship, so that the ship can easily and quickly turn back from the left side without consuming a lot of fuel.

When the forward direction of the ship is to be adjusted, for example, when the ship is deflected in a certain direction to the left, the air-water mixture containing bubbles can be injected into the water area in front of the left side of the ship, then the water density of the water area in front of the left side of the ship is lower than that of other water areas, and the wave-making resistance, partial frictional resistance and eddy resistance in front of the left side of the ship are lower than those of other positions, so that the ship can easily deflect to the left. Or the air-water mixture containing bubbles is injected into the water area in back of the right side of the ship, then the water density of the water area in back of the right side of the ship is lower than that of other water areas, and the wave-making resistance, partial frictional resistance and eddy resistance in back of the right side of the ship are lower than those of other positions, so that the rear side of the ship can easily deflect to the right, and correspondingly, the front side of the ship can easily and quickly deflect to the right without consuming a lot of fuel.

When the ship is about to translate, the air-water mixture containing bubbles can be injected into the water area on one side of the ship, to assist the ship in translating to the side. Taking right translation of the ship as an example, as shown in FIG. 3, the air-water mixture containing bubbles is injected into the water area on the right side of the ship, then the water density of the water area on the right side of the ship is lower than that on the left side, and the water density of the water area in back of the right side of the ship is lower than that of the left side, so that the ship can easily and quickly translate to the right without consuming a lot of fuel.

Preferably, in the air-water mixture containing bubbles, the diameter of the bubbles is set to be n mm, and $1 \leq n \geq 50$. If the diameter of the bubbles is less than 1 mm, the bubbles stay in the water for a long time, and the track of the ship is easily exposed. If the diameter of the bubbles is greater than 50 mm, the escape speed of the bubbles is fast, which is not conducive to reducing the frictional resistance between the hull and water.

Figure 4:
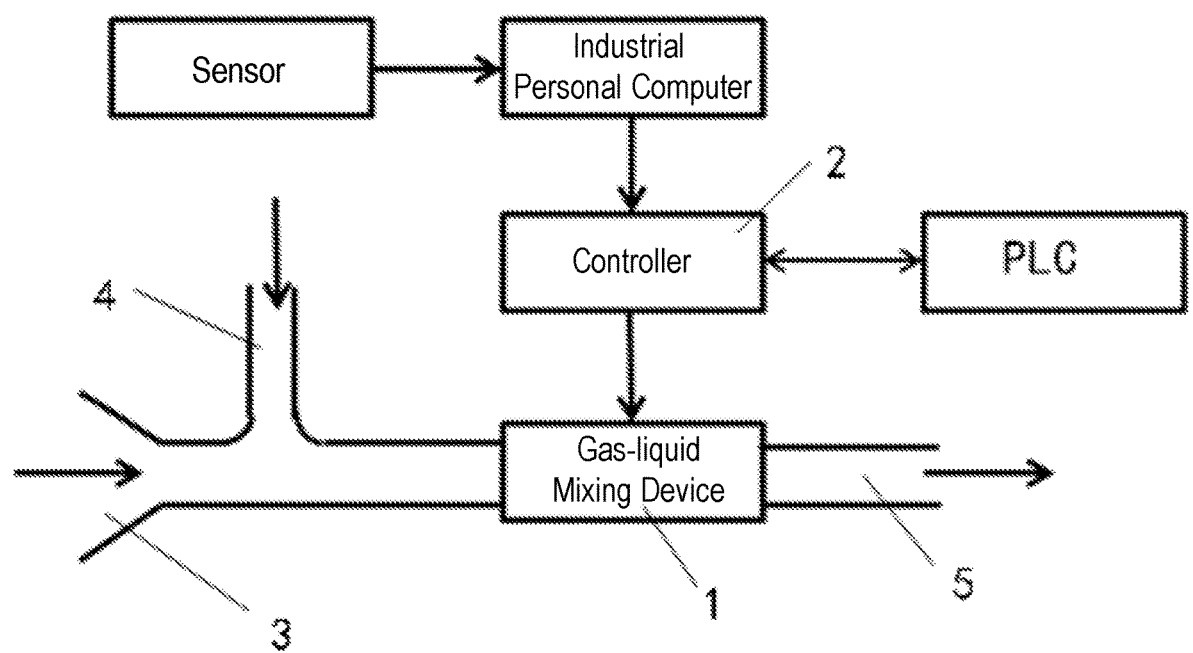
FIG. 4 is a schematic block illustration of a device for reducing the wave-making resistance and friction force during ship navigation in the present invention.

As shown in FIG. 4, the device for generating the air-water mixture containing bubbles in the present invention includes a gas-liquid mixing device 1 and a control device.

The gas-liquid mixing device 1 is provided with a water inlet, a gas inlet and a water outlet. The gas-liquid mixing device is provided with a gas-liquid mixing cavity between the water inlet and the water outlet, water enters the gas-liquid mixing cavity via the water inlet, and air enters the gas-liquid mixing cavity via the gas inlet.

The control device is connected to the gas-liquid mixing device, and controls continuous low-speed water intake, or intermittent suspension of water intake, or cyclic switching between high-speed water intake and low-speed water intake at the water inlet during the gas intake at the gas inlet.

The water entering the gas-liquid mixing cavity is mixed with air to form the air-water mixture containing bubbles, and the air-water mixture is discharged via the water outlet (the directions of arrows in FIG. 4 represent the flow directions of corresponding air, water, and air-water mixture).

Specifically, relative to high-speed water intake at the water inlet, when the control device 2 controls continuous low-speed water intake at the water inlet, more air will enter the gas-liquid mixing cavity from the water inlet along with the water, so that the resulting air-water mixture has a high air content and a large number of bubbles.

The control device 2 controls the water inlet to intermittently suspend water intake, that is, under the control of the control device, the water inlet and the gas inlet work cyclically according to the following modes.

Water intake at the water inlet and gas intake at the gas inlet are implemented at the same time.

The gas intake continues at the gas inlet and the water intake stops at the water inlet.

Water intake at the water inlet and gas intake at the gas inlet are implemented at the same time.

When water intake at the water inlet and gas intake at the gas inlet are implemented at the same time, water and air enter the gas-liquid mixing cavity via the water inlet pipe and the gas inlet pipe respectively, and during this process, the ratio of water to air does not change.

When the gas intake continues at the gas inlet and the water intake stops at the water inlet, water does not enter the gas-liquid mixing cavity, and only air enters the gas-liquid mixing cavity, so that the proportion of air is significantly increased during this process. When water intake at the water inlet and gas intake at the gas inlet are implemented at the same time again, water and air enter the gas-liquid mixing cavity again at a certain ratio via the water inlet and the gas inlet respectively and fully mix with the air and water in the gas-liquid mixing cavity to form an air-water mixture containing bubbles. Since the original proportion of air in the gas-liquid mixing cavity is high, the proportion of air is still obviously high on the whole. Therefore, the air-water mixture produced by mixing air and water has a high air content and a large number of bubbles. In this way, by controlling the intermittent suspension of water intake at the water inlet, the proportion of air in the generated air-water mixture is always high, and the air-water mixture also always contains a large number of bubbles, so that after the air-water mixture is injected into a water area, the water density of the water area can be greatly reduced, and thus the wave-making resistance, friction force and eddy resistance generated in the water area are greatly reduced.

Preferably, the time for suspending water intake is 1 second to 9 seconds. This time is set, so that the air entering the gas-liquid mixing cavity during the suspension of water intake at the water inlet is neither too little to meet the requirement for an air content, nor too much to fail in fully mixing with water.

Preferably, the water intake time between two adjacent suspensions of water intake may also be set to 1 second to 9 seconds.

The control device 2 controls the water inlet to cyclically switch between high-speed water intake and low-speed water intake, that is, under the control of the control device, the water inlet and the gas inlet work cyclically according to the following modes.

High-speed water intake—low-speed water intake—high-speed water intake—low-speed water intake.

When high-speed water intake is implemented at the water inlet, relatively less air enters the gas-liquid mixing cavity together with water via the water inlet, but most air enters via the gas inlet. When the water inlet is controlled to implement low-speed water intake, relatively more air enters the gas-liquid mixing cavity together with water via the water inlet, plus the air entering via the gas inlet, so the total air content in the gas-liquid mixing cavity is relatively high at this time. Such high-speed water intake and low-speed water intake are cyclically switched, so that the generated air-water mixture has a high air content and a large number of bubbles.

Preferably, the time for each low-speed water intake is 1 second to 9 seconds.

The water inlet, gas inlet and water outlet of the gas-liquid mixing device are respectively connected with a water inlet pipe 3, a gas inlet pipe 4 and a water outlet pipe 5. The gas-liquid mixing device at least includes a variable frequency water pump (not shown), a water inlet of the variable frequency water pump is connected to the water inlet pipe or simultaneously connected to the water inlet pipe and the gas inlet pipe, and the control device controls an impeller of the variable frequency water pump to continuously rotate at a low speed, so that the low-speed water intake is continuous at the water inlet. Or, the control device controls the impeller of the variable frequency water pump to cyclically switch between high-speed rotation and low-speed rotation, so that the low-speed water intake is intermittent at the water inlet. Or, the control device controls the impeller of the variable frequency water pump to intermittently suspend rotating, so that the water intake is intermittently suspended at the water inlet.

Preferably, the control device controls the rotation of the impeller of the variable frequency water pump by controlling a motor of the variable frequency water pump. Specifically, when the motor is controlled to suspend operation intermittently, the impeller connected to an output shaft of the motor also suspends rotation intermittently. When the output shaft of the motor is controlled to continuously rotate at a low speed, the impeller naturally continuously rotates at a low speed. When the output shaft of the motor is controlled to switch between low-speed rotation and high-speed rotation, the impeller is also switched between low-speed rotation and high-speed rotation.

In this embodiment, the variable frequency water pump is set as the gas-liquid mixing device, the water outlet of the variable frequency water pump is connected to the water outlet pipe, the water inlet of the variable frequency water pump is connected to the water inlet pipe and the gas inlet pipe by a three-way device, and the pump body cavity of the variable frequency water pump is formed as the gas-liquid mixing cavity.

The control device controls the motor of the variable frequency water pump to suspend operation intermittently, that is, when the motor is operating, water and air enter the pump body cavity of the variable frequency water pump via the water inlet pipe and the gas inlet pipe respectively, and under the high-speed rotation of the impeller, the air and water are fully mixed to form the air-water mixture containing bubbles. When the motor suspends operating for 1 second to 9 seconds, water does not enter the pump body cavity, so relatively more air enters the pump body cavity of the variable frequency water pump via the gas inlet pipe. When the motor re-operates, water and air enter the pump body cavity again at the same time and mix with the existing water and abundant air inside to form the air-water mixture containing a large number of bubbles with a certain diameter, and the air-water mixture containing bubbles is discharged from the water outlet of the variable frequency water pump and the water outlet pipe, and is finally injected into the water areas in front of the ship or/and on both sides of the ship.

The variable frequency water pump is a well-known mature product, which includes a pump body, an impeller arranged in the pump body, an output shaft, and a motor connected with the impeller. These technologies are well-known technologies, so details are not described herein again.

The control device is set as a variable frequency governor (e.g.: FR-A740 series universal vector variable frequency governor, HJV700-T3-015 variable frequency governor, etc.), and the operation of the variable frequency water pump is controlled by the variable frequency governor. Different variable frequency water pumps have different settings for high-speed rotation and low-speed rotation, so when different variable frequency water pumps are selected, the speed of low-speed rotation and the speed of high-speed rotation should be set according to the self-definition of the selected variable frequency water pump.

Figure 5:
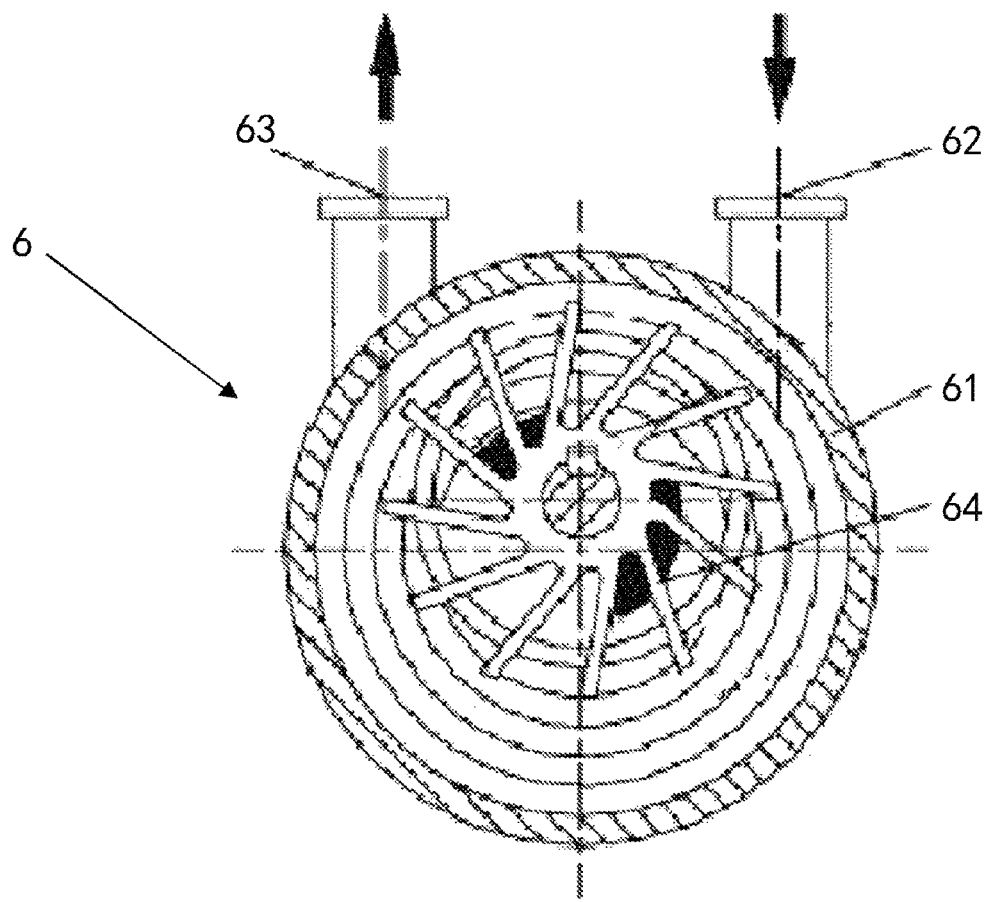
FIG. 5 is a schematic illustration of a device for generating an air-water mixture containing bubbles in the present invention.

In other embodiments, the gas-liquid mixing device includes the variable frequency water pump and a gas-liquid mixing pump 6 (as shown in FIG. 5), the water inlet of the variable frequency water pump is communicated with the water inlet pipe, the gas-liquid mixing pump 6 includes a pump body 61, the pump body is provided with a water inlet 62, a gas inlet and a water outlet 63, the water outlet of the variable frequency water pump is communicated with the water inlet of the gas-liquid mixing pump, the gas inlet of the gas-liquid mixing pump is connected to the gas inlet pipe, and the water outlet of the gas-liquid mixing pump is connected to the water outlet pipe. During the operation of the gas-liquid mixing pump, the control device controls continuous low-speed water intake or intermittent suspension of water intake or cyclic switching between high-speed water intake and low-speed water intake at the water inlet of the variable frequency water pump.

That is, after energy is supplied, the gas-liquid mixing pump operates normally, and the variable frequency governor controls the operation of the variable frequency water pump.

An impeller driven by a motor is arranged in a pump body cavity of the gas-liquid mixing pump 6, the impeller is arranged eccentrically, the impeller is provided with blades 64, and the blades are arranged centrifugally. When the motors of both the variable frequency water pump and the gas-liquid mixing pump rotate, water enters the variable frequency water pump via the water inlet pipe and then enters the pump body cavity of the gas-liquid mixing pump via the water outlet of the variable frequency water pump, and air enters the pump body cavity of the gas-liquid mixing pump via the gas inlet of the gas-liquid mixing pump. During this process, the ratio of air to water in the gas-liquid mixing cavity is kept constant, the impeller of the gas-liquid mixing pump rotates, the water in the pump body cavity is closely attached to the cylindrical wall of the pump body cavity due to the centrifugal force to form a rotating water ring, a crescent-shaped space is formed between the water ring and the impeller, and the blades of the impeller divide this space into a plurality of small chambers. In the rotation direction, the small chamber volume on one side of the axis of the pump body cavity gradually increases, and the small chamber volume on the other side gradually decreases, so that the air and water are fully mixed in the pump body cavity to form an air-water mixture containing a certain amount of bubbles, and when the impeller rotates, the blades continuously push the air-water mixture to the water outlet under the action of centrifugal force. Under the action of the control device, the motor of the variable frequency water pump suspends operation, the motor of the gas-liquid mixing pump continues to operate, then water cannot enter the pump body cavity of the gas-liquid mixing pump, but air continues to enter the pump body cavity of the gas-liquid mixing pump via the gas inlet pipe, so that within the time when the motor of the variable frequency water pump suspends operation, the air content in the pump body cavity of the gas-liquid mixing pump is significantly increased, the proportion of air in the air-water mixture generated during this period is significantly increased, and more bubbles are significantly generated. When the motor of the variable frequency water pump rotates again under the action of the control device, water can enter the pump body cavity of the gas-liquid mixing pump, and air also enters all the time, so on the whole, the proportion of air in the pump body cavity of the gas-liquid mixing pump is still higher than that before the motor of the variable frequency water pump suspends operation, and correspondingly, the air-water mixture generated still has a high air content and many bubbles.

The gas-liquid mixing pump 6 is also a well-known mature product, so other detailed structures are not repeated here.

Figure 6:
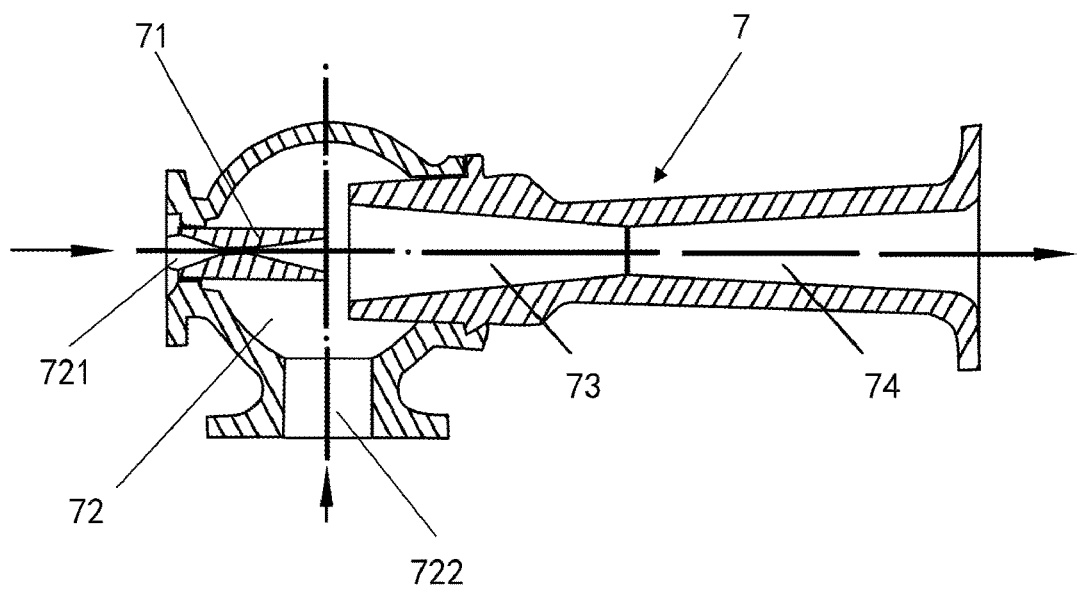
FIG. 6 is a schematic illustration of a Venturi jet device of the device for generating an air-water mixture containing bubbles in the present invention.

In another embodiment, the gas-liquid mixing device includes the variable frequency water pump and a Venturi jet device 7, and a Venturi tube 71, a suction chamber 72, a mixing chamber 73, and a diffusion chamber 74 (as shown in FIG. 6) are arranged in the Venturi jet device. The suction chamber 72 is provided with a water inlet 721 and a gas inlet 722, the water inlet of the variable frequency water pump is connected to the water inlet pipe, the water outlet of the variable frequency water pump is communicated with the water inlet of the suction chamber 72, the gas inlet of the suction chamber 72 is connected to the gas inlet pipe, the outlet of the diffusion chamber is connected to the water outlet pipe, the mixing chamber is set as the gas-liquid mixing cavity, and the control device controls the motor of the variable frequency water pump to suspend operation intermittently.

Under the control of the control device, the motor of the variable frequency water pump operates, air enters the suction chamber from the gas inlet pipe, seawater (river water) enters the Venturi jet device from the variable frequency water pump, passes through the Venturi tube and is sprayed out at a high speed from a nozzle of the Venturi tube and then converged with the air into the mixing chamber, the air flow is cut into a large number of small bubbles under the pressure of high-speed water spray, the bubbles are fully, uniformly and completely mixed with the water in the mixing chamber to form an air-water mixture containing certain bubbles, and the air-water mixture is discharged to the outside via the diffusion chamber. After the control device controls the motor of the variable frequency water pump to suspend operation, water cannot enter the Venturi jet device, but air continues to enter the suction chamber via the gas inlet pipe and then enter the mixing chamber, so the air content in the Venturi tube is significantly increased. After the control device controls the motor of the variable frequency water pump to operate again, water and air enter the Venturi jet device again at the same time, and at this time, the air content in the mixing chamber is relatively increased on the whole, and thus in the generated air-water mixture, the air content is significantly increased and the bubbles are significantly increased.

Preferably, because of the characteristics of the Venturi jet device, that is, the air-water mixture is subjected to a particularly high pressure when it is about to exit the mixing chamber, so that the air-water mixture enters the mixing chamber to form a strong jet flow, which is then injected into the sea (river) via the water outlet pipe. In this way, the bubbles in the air-water mixture injected into water areas can continue to maintain a certain proportion and size, which can ensure the low density of the air-water mixture, that is, ensure that the water density of the water areas can be reduced after the air-water mixture is injected into the water areas.

The Venturi jet device is a well-known technology, and its specific structure and connection of each internal structure are also well-known, so details are not described herein again.

With this Venturi jet device, under a normal working condition, that is, when the motor of the variable frequency water pump operates all the time, the conversion rate of air can reach more than 25%. When the motor of the variable frequency water pump is intermittently suspended, more air enters the Venturi jet device, resulting in a higher air content in the air-water mixture.

Figure 7:
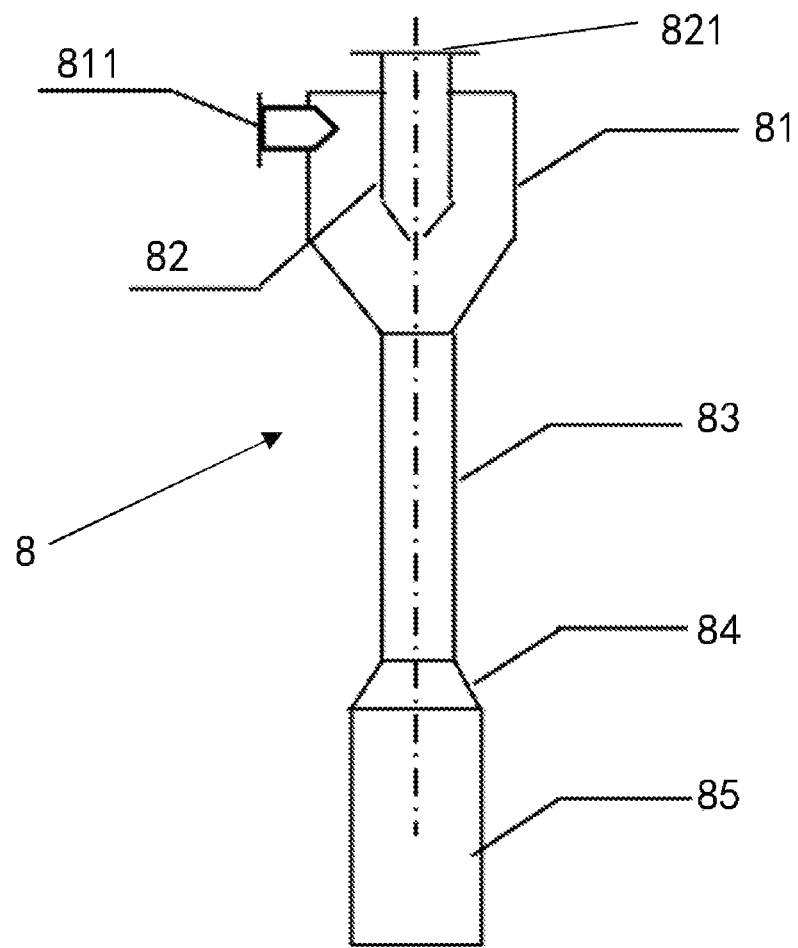
FIG. 7 is a schematic illustration of a Venturi tube type jet device of the device for generating an air-water mixture containing bubbles in the present invention.

In yet another embodiment, the gas-liquid mixing device includes the variable frequency water pump and a Venturi tube type jet device 8. The Venturi tube type jet device includes a suction chamber 81, a liquid inlet pipe 82, a throat pipe 83, a diffusion pipe 84, and a tail pipe 85 (as shown in FIG. 7) that are communicated. The suction chamber 81 is provided with a gas inlet 811, the water outlet of the variable frequency water pump is connected to a liquid inlet 821 of the liquid inlet pipe 82, the gas inlet of the suction chamber is connected to the gas inlet pipe, an outlet of the tail pipe 85 is connected to the water outlet pipe, and the throat pipe 83 is set as the gas-liquid mixing cavity.

The inner diameter of the suction chamber changes from large to small, the inner diameter of the throat pipe 83 is consistent with the tail end of the suction chamber, the inner diameter of the diffusion pipe 84 changes from small to large, the inner diameter of the tail pipe 85 is consistent with the tail end of the diffusion pipe 84, that is, the overall inner diameter of the Venturi tube type jet device changes: large—small—constant—large—constant, and the inner diameter of the liquid inlet pipe 82 also changes from large to small, so that incoming seawater (river water) can be sprayed out at a high speed.

Similarly, during the operation of the motor of the variable frequency water pump, the seawater (river water) enters the Venturi tube type jet device via the variable frequency water pump and the liquid inlet pipe 82 and is sprayed out at a high speed, the strong water flow and air are fully mixed in the throat pipe 83 to form an air-water mixture containing certain bubbles, and the air-water mixture is discharged by the diffusion pipe 84 and the water outlet pipe. When the control device controls the motor of the variable frequency water pump to suspend operation, water cannot enter the throat pipe 83, and only air can enter, so that the air content in the Venturi tube type jet device is greatly increased. When the motor of the variable frequency water pump operates again, water and air enter the Venturi tube type jet device again at the same time, and at this time, the air content in the mixing chamber is relatively increased on the whole, and thus in the generated air-water mixture, the air content is significantly increased and the bubbles are significantly increased.

Water and air can be fully mixed because of the characteristics of the Venturi tube type jet device, the conversion rate of air is high, and the water is controlled to suspend entering intermittently, so that the air content is greatly increased, which can ensure that the proportion of air in the air-water mixture ejected is greatly increased.

The Venturi tube type jet device is a well-known technology, and its structure is also well-known, so details are not described herein again.

The motors of the above-mentioned variable frequency water pump and gas-liquid mixing pump can be driven in any known and feasible manner.

During the operation of the Venturi jet device or the Venturi tube type jet device, the variable frequency governor controls continuous low-speed water intake or intermittent suspension of water intake or cyclic switching between high-speed water intake and low-speed water intake at the water inlet of the variable frequency water pump.

Preferably, the water inlet pipe, the gas inlet pipe and the water outlet pipe are all provided with electric valves 9 thereon, the electric valves 9 are connected with the control device, and the control device controls the flow of the water inlet pipe, the gas inlet pipe and the water outlet pipe by controlling the electric valves 9. When these valves are directly closed, the flow is zero.

Preferably, the variable frequency governor is a variable frequency governor with a PLC, so that the variable frequency governor can not only be better controlled, but also can control the operation of the gas-liquid mixing pump and the electric valves.

For large ships, cruisers, large landing ships, aircraft carriers, etc. of more than 10,000 tons, turbofan or turboshaft or gas turbine engines of higher power are required, and they are all jet engines. The injection port of the jet engine is communicated with the gas inlet of the Venturi jet device or Venturi tube type jet device, so that the high-pressure and high-temperature gas generated at the injection port of the jet engine enters the gas-liquid mixing cavity and mixes with the water in the cavity to form the air-water mixture containing a large number of bubbles. In other embodiments, the combusted exhaust gas can also be directly jetted to the gas inlet of the Venturi jet device or Venturi tube type jet device.

For nuclear-powered ships, a nuclear power generator can supply power to the motors of the variable frequency water pump and the gas-liquid mixing pump, or is directly connected to the impellers of the variable frequency water pump and the gas-liquid mixing pump by a drive shaft of the generator, that is, directly drives the impellers to rotate, or directly inputs high-temperature gas and liquid into the Venturi tube to drive the water inlet to produce bubble water. In other embodiments, the combusted exhaust gas can also be directly jetted from the bow to the sides of the ship.

The device for generating the air-water mixture containing bubbles in the present invention can be placed on a ship, or the gas-liquid mixing device can be placed in loading pontoons on both sides of the ship, and the gas inlet end of the gas inlet pipe connected to the gas inlet of the gas-liquid mixing device is laid along the exterior of the ship and relatively fixed above the waterline.

Preferably, military ships are generally equipped with a sonar device on the bulbous bow. In order to prevent mechanical noise from affecting the sonar device, the equipment that will generate mechanical noise in the device of the present invention can be arranged away from the bulbous bow, and then connected to other related equipment on the ship by pipes.

In other embodiments, a propeller can be combined with a Venturi jet device, and the propeller is located in a pod at the front part of the hull. When the propeller rotates, water is driven into the Venturi jet device, air still enters the Venturi jet device via the gas inlet of the Venturi jet device, and the air and water are mixed in the Venturi jet device to form an air-water mixture containing a large number of bubbles.

The device for reducing the wave-making resistance and friction force during ship navigation according to the present invention includes the above-mentioned device for generating the air-water mixture containing bubbles, and further includes an upper computer. The upper computer is connected to the control device and sends instructions to the control device, and the control device controls, according to the instructions, the water inlet to suspend water intake intermittently.

The upper computer may be an industrial personal computer of the ship itself, or may be a separate PLC or a variable frequency governor with PLC function (such as VH3 series, VB5 series, VB5N, and V5 series variable frequency governors), or may be a separate industrial personal computer (such as Advantech IPC-610L/250W/784G2/I5-4590/4G/1T/DVD/KB/MS industrial personal computer). Since the ship is subjected to severe weather at sea all year round, it is related electrical products of military grade that are preferred.

The device for reducing the wave-making resistance and friction force during ship navigation according to the present invention further includes arc-shaped baffles 12 (as shown in FIGS. 1, 2, and 3) open to the rear, and the baffles 12 are connected to the front side of the bow at intervals and located below the waterline 13. When the injected air-water mixture containing bubbles hits the baffles 12 forward, it will be blocked by the baffles 12 and flow backward, so as to be completely mixed with the water in the surrounding water areas of the ship without being jetted to the far side in front of the ship. Accordingly, the utilization rate of the air-water mixture can be improved, thereby ensuring that the water density of the water areas into which the air-water mixture is injected is always low, that is, ensuring that the wave-making resistance, friction force, etc. can be effectively reduced all the time, and further ensuring the high maneuverability, high speed and low fuel consumption of the ship.

Preferably, a polytetrafluoroethylene layer is arranged on surfaces of the arc-shaped baffles 12, and the polytetrafluoroethylene layer can be injection-molded on the baffles 12 or coated on the surfaces of the baffles 12 by other known and feasible ways. With the polytetrafluoroethylene layer, benthos can be prevented from covering the baffles 12, which can ensure the reflection effect on the air-water mixture, and after the ship returns to port, the baffles 12 do not need to be cleaned by special persons, thereby saving manpower and material resources. The arc-shaped baffles 12 may be made of steel.

Preferably, a polytetrafluoroethylene layer is also arranged on the inner and outer surfaces of the water inlet, the gas inlet, the water inlet pipe and the water outlet pipe, the inner cavity wall of the gas-liquid mixing device, and the impellers. That is, the polytetrafluoroethylene layer is arranged at the parts where water flows, to avoid the attachment of aquatic organisms.

The water outlet pipe 5 includes a main pipe 51 and a plurality of branch pipes 52 connected to the main pipe 51 at one end, and the main pipe 51 is connected to the water outlet of the gas-liquid mixing device.

The water outlet pipe 5 is laid on the outside of the hull and fixed relative to the hull, the air-water mixture containing bubbles is directly injected into the water areas from the water outlet of the water outlet pipe, and the water outlet of the water outlet pipe forms an injection port. Or, the hull is provided with a water outlet hole, the water outlet of the water outlet pipe is communicated with the water outlet hole by a flange or the like, and the water outlet hole on the hull is an injection port.

Figure 8:
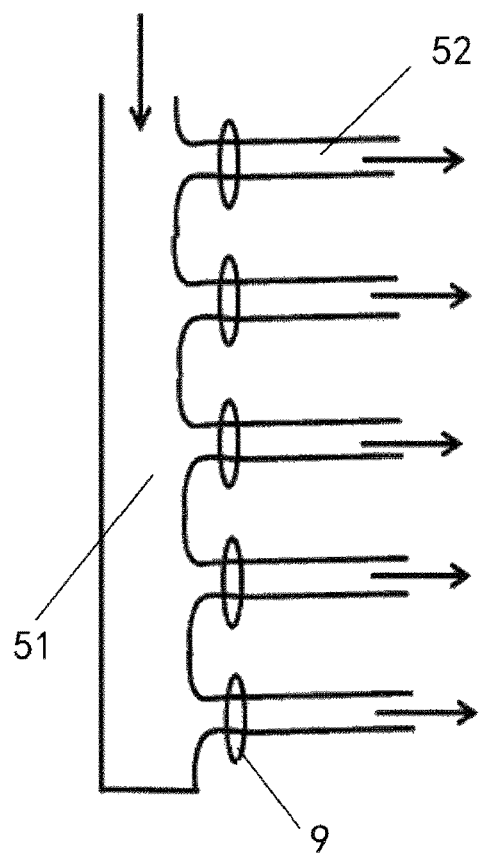
FIG. 8 is a schematic illustration of an embodiment of a water outlet pipe of the device for generating an air-water mixture containing bubbles in the present invention.

In this embodiment, preferably, an electric valve 9 is arranged on each of the branch pipes 52, so that each injection port is independently controlled (as shown in FIG. 8, the arrows in the figure represent the flow direction of the air-water mixture). Thus, the control is more accurate. For example, when the ship is sailing, waves will interfere with the ship, so that the ship swings up and down, the bow of the ship sometimes leaves the water surface, and some injection ports also leave the water surface. Corresponding solenoid valves can control these injection ports to close without injecting the air-water mixture into water areas, while other injection ports still below the waterline maintain the injection operation.

Figure 9:
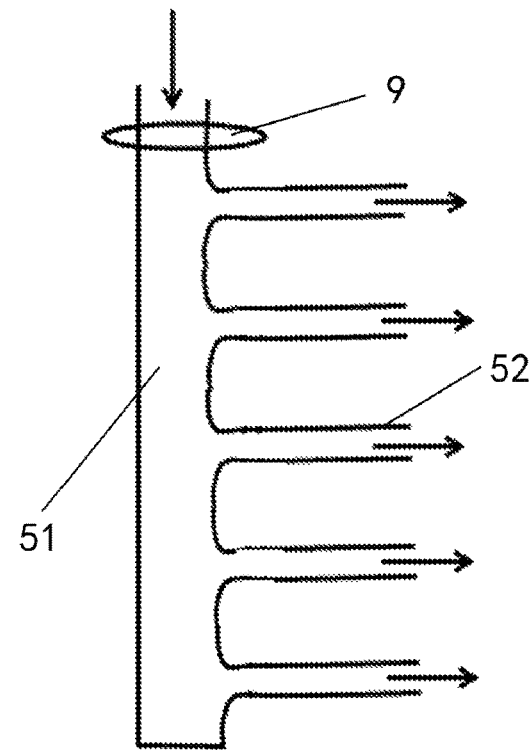
FIG. 9 is a schematic illustration of another embodiment of the water outlet pipe of the device for generating an air-water mixture containing bubbles in the present invention.

In other embodiments, an electric valve 9 may also be arranged on the main pipe 51, so that the plurality of injection ports are controlled together (as shown in FIG. 9, the arrows in the figure represent the flow direction of the air-water mixture).

Figure 10:
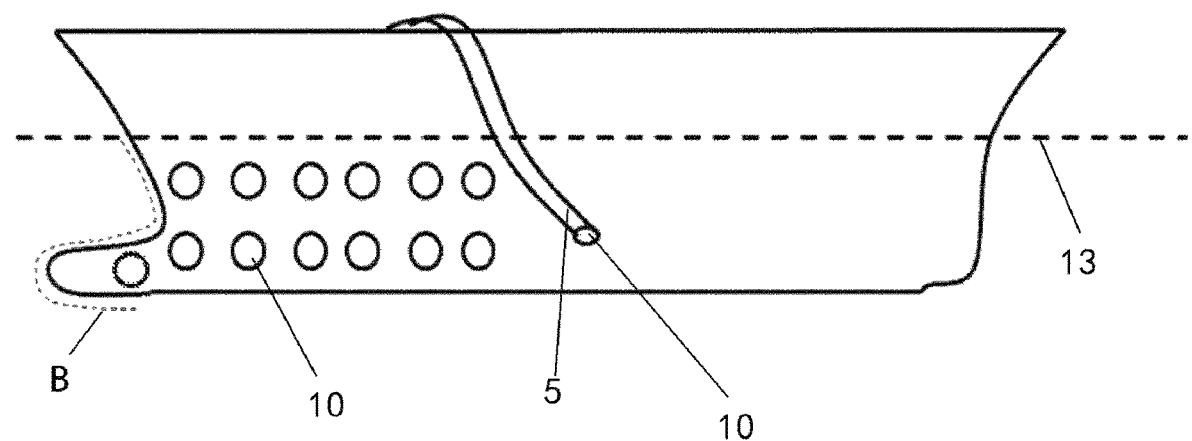
FIG. 10 is a schematic illustration of a ship sailing on the water.

A plurality of injection ports 10 are arranged at the front end of the ship and on both sides of the ship (FIGS. 1, 2, and 3 merely illustrate the approximate positions of the injection ports 10 arranged on the ship. For easy understanding, the dotted line indicated by B in FIG. 10 indicates that the ship is provided with injection ports at corresponding positions). The injection ports 10 may be arranged in a single row or in multiple rows up and down at intervals. The number of the injection ports 10 can be determined according to the tonnage of the ship. The number of injection ports 10 of a ship with a heavy tonnage is greater than that of a ship with a light tonnage. The injection ports 10 may be arranged on the hull of the ship or on the bulbous bow of the ship.

The injection ports 10 are arranged below the waterline 13, so that the bubbles and air in the air-water mixture can be completely dissolved in water areas, and the bubbles will not burst in the air to lose effect.

Preferably, the injection ports 10 on both sides of the ship are arranged obliquely backward, so that when the air-water mixture is jetted out, it is not perpendicular to the hull, but is injected into the water areas at the oblique rear part. Thus, all the air-water mixture will be mixed with the water areas on the driving route instead of flowing to the outside, and the bubbles in the air-water mixture also escape and burst to the rear of the ship in the navigation direction instead of floating out. In this way, the utilization rate of the bubbles and the air-water mixture is further improved, which can ensure that the water density of the water areas into which the air-water mixture is injected is always low, that is, ensure that the wave-making resistance can be effectively reduced all the time. The injection ports 10 are arranged obliquely backward, that is, the injection ports 10 and openings on the hull are formed obliquely backward, and nozzles are laid obliquely.

The injection ports 10 at the front end of the ship are arranged forward.

In this embodiment, the injection ports at the front end of the ship may be smaller than the injection ports on both sides of the ship. Since the air-water mixture ejected from the injection ports at the front end of the ship is mainly used to expel the water flow in front of the ship, the flow can be relatively small.

Preferably, the injection ports 10 on both sides of the ship are arranged at the middle and front part of the hull, and the injection ports 10 are not arranged at the positions behind the middle part of the hull, which can avoid damage to the equipment such as propellers on the rear side of the ship by the air-water mixture ejected from rear injection ports 10 (FIGS. 1, 2, and 3 only show the middle and front parts of the ship on which the injection ports are arranged, the rear part of the ship on which no injection ports are arranged is not shown).

Further, the injection ports on both sides of the ship are arranged on both sides of the bow, that is, on the arc-shaped parts between the front end of the ship and the horizontal parts of both sides of the hull. The ship mainly relies on the parts to expel water areas during navigation.

According to the power, one or more devices for generating the air-water mixture containing bubbles of the present invention can be configured, or one device can be arranged corresponding to each injection port.

Figure 11:
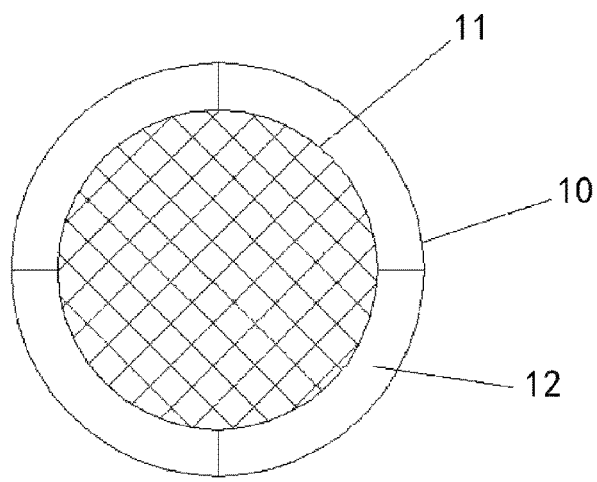
FIG. 11 is an enlarged schematic illustration of an injection port.

As shown in FIG. 11, preferably, a blocking net 11 is connected to the middle of the injection port 10, and the hole diameter of the blocking net is greater than 1 mm. Thus, grids of the blocking net can cut the water in the air-water mixture, to generate some bubbles again at this position. In addition, since the blocking net 11 is connected to the middle of the injection port 10, a gap 12 is formed between the blocking net 11 and the inner wall of the injection port. The gap 12 can prevent the injection port from being blocked.

Preferably, a polytetrafluoroethylene layer is also attached to the surface of the blocking net.

Preferably, the above-mentioned blocking net is also arranged on the liquid entry port, so that the entering water can be cut to form bubbles and then enter the gas-liquid mixing cavity, which enables the air content in the generated air-water mixture to be higher.

In other embodiments (not shown), expandable or foldable transverse louvered baffles and expandable or foldable vertical louvered baffles may also be connected to one side of the injection ports. When the transverse louvered baffles and the vertical louvered baffles are all pulled, the injection ports are formed as matrix aperture water outlets, and these baffles can also cut water. The expansion degree of the transverse louvered baffles and the vertical louvered baffles is adjusted according to the requirements, so as to be able to adjust the coverage of the matrix aperture water outlets of the injection ports.

Preferably, the above-mentioned transverse louvered baffles and vertical louvered baffles may also be arranged over the liquid entry port.

The gas inlet pipe is laid on the ship and fixed relative to the hull, and air directly enters the gas-liquid mixing cavity through the gas inlet pipe, so that the gas inlet of the gas inlet pipe is formed as a gas entry port. Or, a gas inlet is arranged at the part of the hull above the waterline, the gas inlet pipe is communicated with the gas inlet, and the gas inlet on the hull is formed as a gas entry port. The gas entry port is arranged above the waterline.

The gas inlet of the device for reducing the wave-making resistance and friction force during ship navigation according to the present invention is located above the waterline 13.

The water inlet pipe is laid on the outside of the hull and fixed relative to the hull, and water enters directly from the water inlet of the gas inlet pipe, so that the water inlet of the water inlet pipe is formed as a water inlet of the device for reducing the wave-making resistance and friction force during ship navigation according to the present invention. Or, the hull is provided with a water inlet hole, the water inlet of the water inlet pipe is communicated with the water inlet hole by a flange or the like, and the water inlet hole on the hull is a water inlet of the device for reducing the wave-making resistance and friction force during ship navigation according to the present invention.

In other embodiments, the traditional chimney design can be abandoned in the ship, the exhaust gas generated by the main engine is discharged into a pipe, the pipe is partially fixed on the part of the ship below the horizontal plane, and an outlet of the pipe is communicated with the gas inlet of the gas inlet pipe, so that the exhaust gas generated by the main engine will be cooled by seawater when passing through the pipe, and then mixed with the water in the gas-liquid mixing cavity to form the above-mentioned air-water mixture containing bubbles, which is then injected into water areas via the injection ports to reduce the density of the water areas. Thus, the waste can be utilized, and the infrared characteristics of the ship and the probability of being detected can be greatly reduced.

Preferably, the water inlet of the device for reducing the wave-making resistance and friction force during ship navigation according to the present invention is arranged on the lower side of the injection port. When the air-water mixture containing bubbles is injected into water areas from the injection port, the bubbles will move upward. The water inlet is arranged on the lower side of the injection port, so that when water enters, the bubbles will not be sucked in, which ensures the utilization rate of the air-water mixture.

Preferably, the water inlet of the device for reducing the wave-making resistance and friction force during ship navigation according to the present invention is arranged at the front part of the ship. When water enters from the water inlet, a suction force is formed in the water area in front of the ship. When the air-water mixture is injected obliquely backward on both sides of the ship, a thrust that pushes the ship forward is formed. Therefore, the suction force in the front, the thrust in the back, and the effect of reducing the water density can completely cancel the power loss of the device for generating the air-water mixture containing bubbles in the present invention, and can also greatly improve the performance of the ship.

Preferably, the water inlets of the device for reducing the wave-making resistance and friction force during ship navigation according to the present invention are arranged on both sides of the front part of the ship, so that when the ship sails forward, suction forces can be generated on both sides at the same time, which enables the ship to sail faster.

Various sensors on the ship transfer the detected data to the upper computer, such as flow rate of seawater (river water), temperature, air pressure, wind speed, ship speed, and navigation direction. The industrial personal computer determines, according to the data, the required injection volume, injection speed and injection position of the air-water mixture, so as to send instructions to the control device. The control device controls, according to the instructions, the electric valves 9 of each water inlet pipe, gas inlet pipe and water outlet pipe or/and the motor of the variable frequency water pump, to control the flow and position of water intake, gas intake and water discharge, so as to adjust the injection volume, injection speed and injection position of the air-water mixture containing bubbles, and further realize the operations of speed adjustment, U turn or translation of the ship. For example, the electric valves 9 on the water outlet pipes corresponding to all the injection ports 10 on the ship are opened, so that the navigation speed of the ship can be greatly increased, or the fuel consumption can be greatly reduced at the same speed. Or, only the electric valves 9 on the water outlet pipes corresponding to the injection ports 10 in the front of one side of the ship or/and in the back of the other side of the ship are opened, and the opening degree of these electric valves 9 is adjusted, the electric valves 9 on the water outlet pipes corresponding to the other injection ports 10 are closed, then the air-water mixture containing bubbles is injected into water areas only from the injection ports 10 in the front of one side of the ship or/and in the back of the other side of the ship, and the ship can quickly turn or turn around. Or, only the electric valves 9 on the water outlet pipes corresponding to the injection ports 10 on one side of the ship are opened, and the electric valves 9 on the water outlet pipes corresponding to the other injection ports 10 are closed, so that the ship can translate to this side. In this way, the performance of the ship is greatly improved.

When the injection ports 10 are all arranged at the front end and on both sides of the middle and front parts of the ship, the above-mentioned injection of the air-water mixture into the water area in back of the other side of the ship refers to the injection of the air-water mixture into the sea (water) through the injection ports 10 on the rear part among the injection ports 10 arranged on both sides of the ship. Similarly, the injection of the air-water mixture into the water area on one side of the ship refers to the injection of the air-water mixture into the water area through the injection ports 10 arranged on this side of the ship.

For a submarine sailing on the sea level, the above-mentioned method may also be used for the head of the submarine to increase the speed. The relevant devices and methods used for increasing the speed of the submarine underwater are other research topics and will not be described in detail in the present application.

To sum up, the method and device of the present invention are suitable for medium and large ships with a speed of 20 to 45 knots or more. According to the driving needs, the air-water mixture containing bubbles is injected into the water areas in front of the ship or/and on both sides of the ship, which can greatly reduce the density of seawater (river water) in the relevant water areas of the bow, thereby reducing the wave-making resistance, partial frictional resistance and eddy resistance of the relevant parts of the ship, and achieving the purposes of fast speed, low fuel consumption and high maneuverability. Moreover, the device of the present invention has less investment and quick effect. Therefore, the method and device of the present invention can improve the performance of China's vessels and ships by a level, to reach the navigation performance indicators of vessels and ships in the United States, Europe, and Japan, thereby meeting the requirements of military and civil vessels and ships for energy conservation, emission reduction and performance improvement, and promoting the development of ships and vessels. In addition, the method and device of the present invention have obvious economic benefits, and can further promote the development of China's naval modernization of national defense, which is in line with national development needs.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for reducing wave-making resistance and friction force during ship navigation, the method comprising: injecting, an air-water mixture containing bubbles that is generated by a device, into water areas in front of a ship or/and on both sides of the ship; wherein, in the air-water mixture, a volume ratio of air is 10% to 60%, wherein the device generating the air-water mixture containing bubbles comprises:

a gas-liquid mixing device, provided with a water inlet, a gas inlet and a water outlet, wherein the gas-liquid mixing device is further provided with a gas-liquid mixing cavity between the water inlet and the water outlet, water enters the gas-liquid mixing cavity via the water inlet, and gas enters the gas-liquid mixing cavity via the gas inlet; and a control device, which is connected to the gas-liquid mixing device, and controls continuous low-speed water intake, or intermittent suspension of water intake, or cyclic switching between high-speed water intake and low-speed water intake at the water inlet during the gas intake at the gas inlet;

wherein the water entering the gas-liquid mixing cavity is mixed with air to form the air-water mixture containing bubbles, and the air-water mixture is discharged via the water outlet;

the water intake is suspended at the water inlet each time for 1 second to 9 seconds; or, when the low-speed water intake is intermittent at the water inlet, a time for the low-speed water intake each time is 1 second to 9 seconds.

2. The method for reducing the wave-making resistance and friction force during ship navigation according to claim 1, wherein the air-water mixture containing bubbles is injected into the water areas in front of one side of the ship or/and in back of the other side of the ship, to assist the ship in turning or turning around; or, the air-water mixture containing bubbles is injected into the water area on one side of the ship, to assist the ship in translating to the side.

3. A device for generating an air-water mixture containing bubbles, comprising:

a gas-liquid mixing device, provided with a water inlet, a gas inlet and a water outlet, wherein the gas-liquid mixing device is further provided with a gas-liquid mixing cavity between the water inlet and the water outlet, water enters the gas-liquid mixing cavity via the water inlet, and gas enters the gas-liquid mixing cavity via the gas inlet; and a control device, which is connected to the gas-liquid mixing device, and controls continuous low-speed water intake, or intermittent suspension of water intake, or cyclic switching between high-speed water intake and low-speed water intake at the water inlet during the gas intake at the gas inlet;

wherein the water entering the gas-liquid mixing cavity is mixed with air to form the air-water mixture containing bubbles, and the air-water mixture is discharged via the water outlet;

the water intake is suspended at the water inlet each time for 1 second to 9 seconds; or, when the low-speed water intake is intermittent at the water inlet, a time for the low-speed water intake each time is 1 second to 9 seconds.

4. The device for generating the air-water mixture containing bubbles according to claim 3, wherein the water inlet, the gas inlet and the water outlet of the gas-liquid mixing device are respectively connected with a water inlet pipe, a gas inlet pipe and a water outlet pipe; the gas-liquid mixing device comprises a variable frequency water pump, a water inlet of the variable frequency water pump is connected to the water inlet pipe or simultaneously connected to the water inlet pipe and the gas inlet pipe, and the control device controls an impeller of the variable frequency water pump to continuously rotate at a low speed, so that the low-speed water intake is continuous at the water inlet; or, the control device controls the impeller of the variable frequency water pump to cyclically switch between high-speed rotation and low-speed rotation, so that the low-speed water intake is intermittent at the water inlet; or, the control device controls the impeller of the variable frequency water pump to intermittently suspend rotating, so that the water intake is intermittently suspended at the water inlet.

5. The device for generating the air-water mixture containing bubbles according to claim 4, wherein the variable frequency water pump is set as the gas-liquid mixing device, the water inlet of the variable frequency water pump is connected to the water inlet pipe and the gas inlet pipe by a three-way device, the water outlet is connected to the water outlet pipe, and a pump body cavity of the variable frequency water pump forms the gas-liquid mixing cavity.

6. The device for generating the air-water mixture containing bubbles according to claim 4, wherein the gas-liquid mixing device comprises the variable frequency water pump and a gas-liquid mixing pump, the water inlet of the variable frequency water pump is communicated with the water inlet pipe, the gas-liquid mixing pump comprises a pump body, the pump body is provided with a water inlet, a gas inlet and a water outlet, the water outlet of the variable frequency water pump is communicated with the water inlet of the gas-liquid mixing pump, the gas inlet of the gas-liquid mixing pump is connected to the gas inlet pipe, the water outlet of the gas-liquid mixing pump is connected to the water outlet pipe, and a pump body cavity of the gas-liquid mixing pump is the gas-liquid mixing cavity; during an operation of the gas-liquid mixing pump, the control device controls continuous low-speed water intake or intermittent suspension of water intake or cyclic switching between high-speed water intake and low-speed water intake at the water inlet of the variable frequency water pump.

7. The device for generating the air-water mixture containing bubbles according to claim 4, wherein the gas-liquid mixing device comprises the variable frequency water pump and a Venturi jet device; a Venturi tube, a suction chamber, a mixing chamber, and a diffusion chamber that are communicated are arranged in the Venturi jet device; and the suction chamber is provided with a water inlet and a gas inlet, the water inlet of the variable frequency water pump is connected to the water inlet pipe, the water outlet of the variable frequency water pump is communicated with the water inlet of the suction pump, the gas inlet of the suction pump is connected to the gas inlet pipe, the outlet of the diffusion chamber is connected to the water outlet pipe, and the mixing chamber is set as the gas-liquid mixing cavity.

8. The device for generating the air-water mixture containing bubbles according to claim 4, wherein the gas-liquid mixing device comprises the variable frequency water pump and a Venturi tube type jet device; the Venturi tube type jet device comprises a suction chamber, a liquid inlet pipe, a throat pipe, a diffusion pipe, and a tail pipe that are communicated; the suction chamber is provided with a gas inlet, the water outlet of the variable frequency water pump is connected to a liquid inlet of the liquid inlet pipe, the gas inlet of the suction chamber is connected to the gas inlet pipe, an outlet of the tail pipe is connected to the water outlet pipe, and the throat pipe is set as the gas-liquid mixing cavity.

9. The device for generating the air-water mixture containing bubbles according to claim 4, wherein the water inlet pipe, the gas inlet pipe and the water outlet pipe are all provided with electric valves thereon, the electric valves are connected to the control device, and the control device controls the flow and switching of the water inlet pipe, the gas inlet pipe and the water outlet pipe by controlling the electric valves.

10. A device for reducing wave-making resistance and friction force during ship navigation, comprising the device for generating the air-water mixture containing bubbles according to claim 4, and an upper computer, wherein the upper computer is connected to the control device and sends instructions to the control device, and the control device controls, according to the instructions, the water intake at the water inlet and the gas intake at the gas inlet of the device for generating the air-water mixture containing bubbles.

11. The device for reducing the wave-making resistance and friction force during ship navigation according to claim 10, further comprising arc-shaped baffles open rearward, wherein the baffles are connected to a front side of the bow at intervals and located below a waterline; when the injected air-water mixture containing bubbles hits the baffles forward, the injected air-water mixture containing bubbles is blocked by the baffles and flow backward; a polytetrafluoroethylene layer is arranged on surfaces of the arc-shaped baffles.

12. The device for reducing the wave-making resistance and friction force during ship navigation according to claim 11, wherein the water outlet pipe is laid on an outside of a hull and fixed relative to the hull, the air-water mixture containing bubbles is directly injected into water areas from the water outlet of the water outlet pipe, and the water outlet of the water outlet pipe is formed as an injection port; or, the hull is provided with a water outlet hole, the water outlet of the water outlet pipe is communicated with the water outlet hole by a flange, and the water outlet hole on the hull is formed as an injection port; a plurality of injection ports are formed at a front end of the ship or/and on both sides of the ship, and the injection ports are arranged below the waterline; the injection ports at the front end of the ship are arranged forward, and the injection ports on both sides are arranged obliquely backward; the injection ports on both sides of the ship are arranged at middle and front parts of the hull.

13. The device for reducing the wave-making resistance and friction force during ship navigation according to claim 12, wherein the water inlet pipe is laid on the outside of the hull and fixed relative to the hull, and water enters directly from the water inlet of the gas inlet pipe, so that the water inlet of the water inlet pipe is formed as a liquid entry port; or, the hull is provided with a water inlet hole, the water inlet of the water inlet pipe is communicated with the water inlet hole, and the water inlet hole on the hull is a liquid entry port.

14. The device for reducing the wave-making resistance and friction force during ship navigation according to claim 13, wherein the liquid entry port is arranged below the injection port; and the liquid entry port is arranged at the front part of the ship.

15. The device for reducing the wave-making resistance and friction force during ship navigation according to claim 14, wherein the gas inlet pipe is laid on the ship and fixed relative to the hull, and air directly enters the gas-liquid mixing cavity through the gas inlet pipe, so that the gas inlet of the gas inlet pipe is formed as a gas entry port; or, a gas inlet is arranged at a part of the hull above the waterline, the gas inlet pipe is communicated with the gas inlet, and the gas inlet on the hull is formed as a gas entry port; and the gas entry port is arranged above the waterline.

16. The device for reducing the wave-making resistance and friction force during ship navigation according to claim 10, wherein the water outlet pipe is laid on an outside of a hull and fixed relative to the hull, the air-water mixture containing bubbles is directly injected into water areas from the water outlet of the water outlet pipe, and the water outlet of the water outlet pipe is formed as an injection port; or, the hull is provided with a water outlet hole, the water outlet of the water outlet pipe is communicated with the water outlet hole by a flange, and the water outlet hole on the hull is formed as an injection port; a plurality of injection ports are formed at a front end of the ship or/and on both sides of the ship, and the injection ports are arranged below the waterline; the injection ports at the front end of the ship are arranged forward, and the injection ports on both sides are arranged obliquely backward; the injection ports on both sides of the ship are arranged at middle and front parts of the hull.

17. The device for reducing the wave-making resistance and friction force during ship navigation according to claim 13, wherein the gas inlet pipe is laid on the ship and fixed relative to the hull, and air directly enters the gas-liquid mixing cavity through the gas inlet pipe, so that the gas inlet of the gas inlet pipe is formed as a gas entry port; or, a gas inlet is arranged at a part of the hull above the waterline, the gas inlet pipe is communicated with the gas inlet, and the gas inlet on the hull is formed as a gas entry port; and the gas entry port is arranged above the waterline.

18. The device for reducing the wave-making resistance and friction force during ship navigation according to claim 11, wherein the gas inlet pipe is laid on the ship and fixed relative to the hull, and air directly enters the gas-liquid mixing cavity through the gas inlet pipe, so that the gas inlet of the gas inlet pipe is formed as a gas entry port; or, a gas inlet is arranged at a part of the hull above the waterline, the gas inlet pipe is communicated with the gas inlet, and the gas inlet on the hull is formed as a gas entry port; and the gas entry port is arranged above the waterline.

19. The device for reducing the wave-making resistance and friction force during ship navigation according to claim 10, wherein the gas inlet pipe is laid on the ship and fixed relative to the hull, and air directly enters the gas-liquid mixing cavity through the gas inlet pipe, so that the gas inlet of the gas inlet pipe is formed as a gas entry port; or, a gas inlet is arranged at a part of the hull above the waterline, the gas inlet pipe is communicated with the gas inlet, and the gas inlet on the hull is formed as a gas entry port; and the gas entry port is arranged above the waterline.

* * * * *